(12) United States Patent  
Kreitzer et al.

(10) Patent No.: US 9,479,686 B2
(45) Date of Patent: Oct. 25, 2016

(54) ZOOM LENS OPTICAL SYSTEM

(71) Applicants: Melvyn H Kreitzer, Cincinnati, OH (US); Jacob Moskovich, Cincinnati, OH (US)

(72) Inventors: Melvyn H Kreitzer, Cincinnati, OH (US); Jacob Moskovich, Cincinnati, OH (US)

( * ) Notice: Subject to any disclaimer, the term of this patent is extended or adjusted under 35 U.S.C. 154(b) by 221 days.

(21) Appl. No.: 14/183,844

(22) Filed: Feb. 19, 2014

(65) Prior Publication Data

US 2015/0234149 A1    Aug. 20, 2015

(51) Int. Cl.
*H04N 5/225* (2006.01)
*G02B 15/16* (2006.01)
*G02B 13/00* (2006.01)

(52) U.S. Cl.
CPC ............ *H04N 5/2259* (2013.01); *G02B 15/16* (2013.01); *G02B 13/0065* (2013.01); *H04N 5/2254* (2013.01)

(58) Field of Classification Search
CPC .. H04N 5/2259; H04N 5/2254; G02B 15/16; G02B 13/0065; G02B 7/04; G02B 7/282; G02B 13/009; G02B 15/00; G03B 2205/0046; G08B 13/1963; G08B 396/72; G08B 359/676; G08B 352/142
See application file for complete search history.

(56) References Cited

U.S. PATENT DOCUMENTS

| | | | |
|---|---|---|---|
| 4,033,674 A | 7/1977 | Sekiguchi | |
| 4,249,798 A | 2/1981 | Moskovich | |
| 4,991,943 A | 2/1991 | Betensky | |
| RE35,775 E | 4/1998 | Betensky et al. | |
| 6,900,946 B2 | 5/2005 | Kochler | |
| 7,012,759 B2 | 3/2006 | Betensky et al. | |
| 7,123,421 B1 | 10/2006 | Moskovich et al. | |
| 7,227,682 B2 | 6/2007 | Caldwell et al. | |
| 7,505,210 B2 | 3/2009 | Kuroda et al. | |
| 8,149,519 B2 | 4/2012 | Yamanashi | |
| 2005/0259330 A1* | 11/2005 | Neil ................. | G02B 13/14 359/676 |
| 2006/0056050 A1* | 3/2006 | Caldwell ............ | G02B 15/177 359/686 |
| 2007/0008418 A1 | 1/2007 | Kuroda et al. | |
| 2008/0198451 A1* | 8/2008 | Gohman ............ | G02B 15/177 359/432 |
| 2008/0198452 A1* | 8/2008 | Fujihara ............ | G02B 15/163 359/432 |
| 2008/0259464 A1* | 10/2008 | Kuroda ............. | G02B 15/173 359/686 |

(Continued)

FOREIGN PATENT DOCUMENTS

EP    1 779 168 B1    2/2012

OTHER PUBLICATIONS

PCT/US2015/015532, Advance E-Mail, PCT Notification, 1 page, Sep. 1, 2016.

(Continued)

*Primary Examiner* — Mekonnen Dagnew
(74) *Attorney, Agent, or Firm* — Steven J. Rosen

(57) ABSTRACT

A zoom lens includes an optical path extending between object and image ends, two or more zoom lens groups, an intermediate real image plane in optical path, and all zoom lens groups on an image side or an object side of intermediate real image plane. Zoom lens may include at least one optical path fold in optical path. Field optics in the vicinity of and associated with intermediate real image plane may be in optical path. Zoom lens may include a fixed rear optical group nearest to image end in optical path and a fixed aperture stop in fixed rear optical group wherein aperture stop remains stationary during zooming. Zoom lens may have a magnification with an absolute value greater than 0.4 between intermediate and final real image planes located at image end. Zoom lens may be entirely within a housing of a digital camera or cellphone during its operation.

26 Claims, 6 Drawing Sheets

(56) References Cited

U.S. PATENT DOCUMENTS

| | | | |
|---|---|---|---|
| 2009/0207502 A1* | 8/2009 | Cho | G02B 15/177 359/689 |
| 2009/0324207 A1 | 12/2009 | Hatakeyama et al. | |
| 2010/0265363 A1 | 10/2010 | Kim | |
| 2010/0315722 A1 | 12/2010 | Hsu et al. | |
| 2012/0086821 A1 | 4/2012 | Yasutomi et al. | |
| 2014/0002715 A1* | 1/2014 | Wang | G02B 15/177 348/345 |

OTHER PUBLICATIONS

PCT/US2015/015532, PCT International Preliminary Report on Patentability, 15 pages, Aug. 23, 2016.

* cited by examiner

ZOOM LENS OPTICAL SYSTEM

BACKGROUND OF THE INVENTION

1. Field of the Invention

The present invention relates generally to a zoom lens optical system that is suitable for a mobile phone camera or a digital camera using an image pickup device and, more particularly, to a small physical size zoom lens optical system capable of a high degree of magnification variation.

2. Description of Related Art

Zoom lens optical systems are used in electronic digital cameras using an image pickup device. Such optical systems focus light on an image pickup device such as a Charge-Coupled Device (CCD) or a Complementary Metal-Oxide Semiconductor (CMOS). These optical systems also may include folding optics to bend an optical path and thereby satisfy packaging requirements imposed by the camera configuration. Typical folding optics include a prism or a folding mirror.

The modern cellphone contains a very efficient camera capable of extremely high quality pictures. Image quality is of the order of 8 megapixels and is achieved by the combination of extremely small pixel dimensions (typically 1.5 micrometers linearly) and a complex diffraction-limited lens. The required lens quality is that of good modulation transfer response out to at least 300 cycles/mm. This implies that lens speeds have to be faster than f/3. F/2.4 is a typical lens speed.

Many such cellphone camera lenses are of short focal length (relative to the image diagonal) resulting in total fields of view of around 65 degrees. This permits a wide variety of general photographs and allows a certain amount of digital zooming which is subject to an immediate and progressive loss of image quality. A 3× digital zoom on an 8 megapixel base system will yield only 0.9 megapixels in the zoomed image.

Such cellphones could benefit from the use of an optical zooming prime lens which is difficult to implement. The zoom lens should firstly satisfy the optical image quality parameters disclosed above which is essentially diffraction-limited with a speed at all focal lengths faster than f/3. The lens also requires a physical size compatible with the size and form factor of the modern cellphone.

It is highly desirable for the zoom lens to be incorporated within the body of a modern cellphone, which implies a (possibly folded) design that has elements comparable in size, and certainly not significantly larger than, the thickness of a typical cellphone, for example on the order of about 7 mm.

As one considers the current state of the art in small camera zoom lenses, it is clear that the widely used design forms will not satisfy the criteria outlined above. Modern small camera zooms invariably use design forms that are simplified by allowing the long focal length end to become significantly slower than the speed at the wide end. This is facilitated by both allowing the aperture stop to move axially and to sometimes change diameter as the lens is zoomed. Lens f/numbers typically change from f/3.5 to f/5.6 as zooming proceeds. This presents a significant opto-mechanical challenge for a cellphone zoom. But, far more importantly, this slower f/number at the long end of the zoom is impermissible for a cellphone with extremely small pixel elements. The required image quality will be unattainable because of diffraction limitations.

Therefore, it is highly desirable to have a zoom lens design that both satisfies the physical (small dimension limitation) and the optical (near diffraction-limited performance at spatial frequencies compatible with very small pixels) requirements of the modern cellphone. It is also highly desirable to have a zoom lens that will permit the zoom lens to fit entirely within the cellphone body and not protrude while zooming. It is also highly desirable to have a zoom lens that is physically robust and able to withstand extremely stringent drop force requirements required by modern cellphones.

SUMMARY OF THE INVENTION

A zoom lens includes an optical path extending from an object end to an image end of the zoom lens, two or more zoom lens groups, and an intermediate real image plane in the optical path. All the zoom lens groups, in combination also referred to as a zoom module, are on an image side or on an object side of the intermediate real image plane.

The zoom lens may include at least one optical path fold in the optical path. The zoom lens may include field optics in the vicinity of and associated with the intermediate real image plane. The zoom lens may include a fixed rear optical group nearest to the image end in the optical path and a stationary aperture stop in the fixed rear optical group, wherein the aperture stop remains stationary during zooming.

In the zoom lens the intermediate real image plane, depending on its position in the optical path, may be re-imaged by either a fixed focal length relay or by a variable focal length relay into a final real image plane located at the image end of the optical path at an average magnification having an absolute value of greater than 0.4. The average magnification is the actual magnification for the fixed focal length relay. The average magnification is the arithmetic average between the low and high ends for the variable focal length relay.

One particular embodiment of the zoom lens includes an optical path extending from an object end to an image end of the zoom lens, a front fixed group near the object end, a zooming module including at least two zoom lens groups, followed by a fixed positive power rear group, an intermediate real image plane in the optical path and in the vicinity of the positive power rear group, and a final real image plane located at the image end of the optical path. The fixed positive power rear group includes an aperture stop which remains stationary during zooming. The fixed positive power rear group also includes a field optics in the vicinity of and associated with the intermediate real image. A fixed focal length relay is located on the image side of the intermediate real image plane and is designed to operate at an average magnification having an absolute value greater than 0.4. The average magnification is the actual magnification for the fixed focal length relay. The front portion of the embodiment of the zoom lens described herein, including all the optics between the object end and the aperture stop, may serve as a near diffraction-limited afocal zoom attachment for an existing cellphone lens. The zoom lens of this embodiment may also include at least one optical path fold in the optical path.

Another particular embodiment of the zoom lens includes an optical path extending from an object end to an image end of the zoom lens, a front fixed group, an intermediate real image plane in the optical path and in the vicinity of the front group, a field optics located in the vicinity and associated with the intermediate real image plane, a zoom module located on the image side of the real intermediate image and including at least two zoom lens groups, followed by a fixed rear group near the image side of the optical path and including a stationary aperture. The zoom module and the fixed rear group of this embodiment of the zoom lens form a variable focal length relay for re-imaging the intermediate real image plane into the final real image plane near the image end at an average magnification having an absolute value of greater than 0.4. The average magnification is the arithmetic average between the low and high ends for the variable focal length relay. Both of the front fixed group and the rear fixed group may include a first optical path fold and a second optical path fold in the optical path.

The zoom lens may be used with or within a digital electronic device including a digital camera having an image pickup device disposed within a housing. The zoom lens is operable to form a final image on the image pickup device and may be disposed within the housing.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
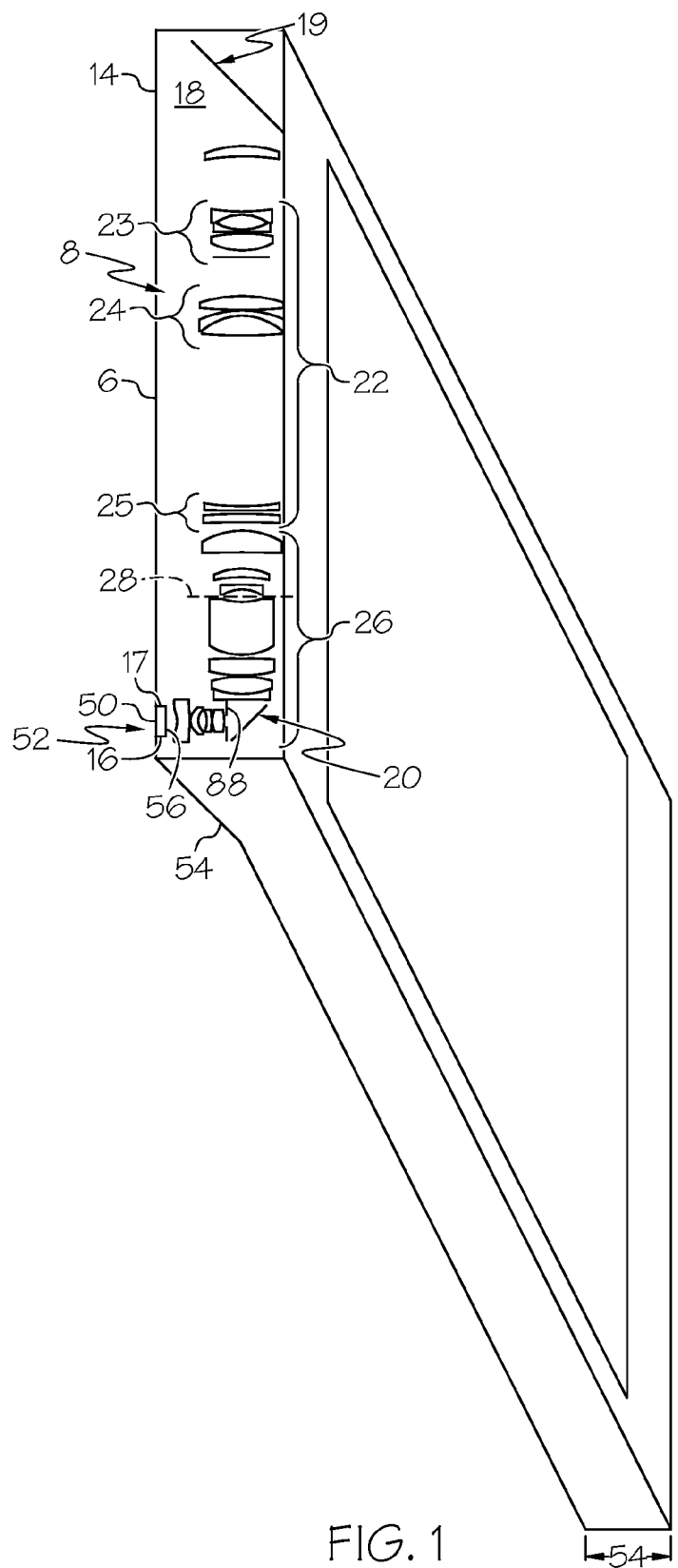
FIG. 1 is a diagrammatical illustration of a cellphone with a first exemplary embodiment of a zoom lens for a digital camera located within a housing of the cellphone.
Figure 2:
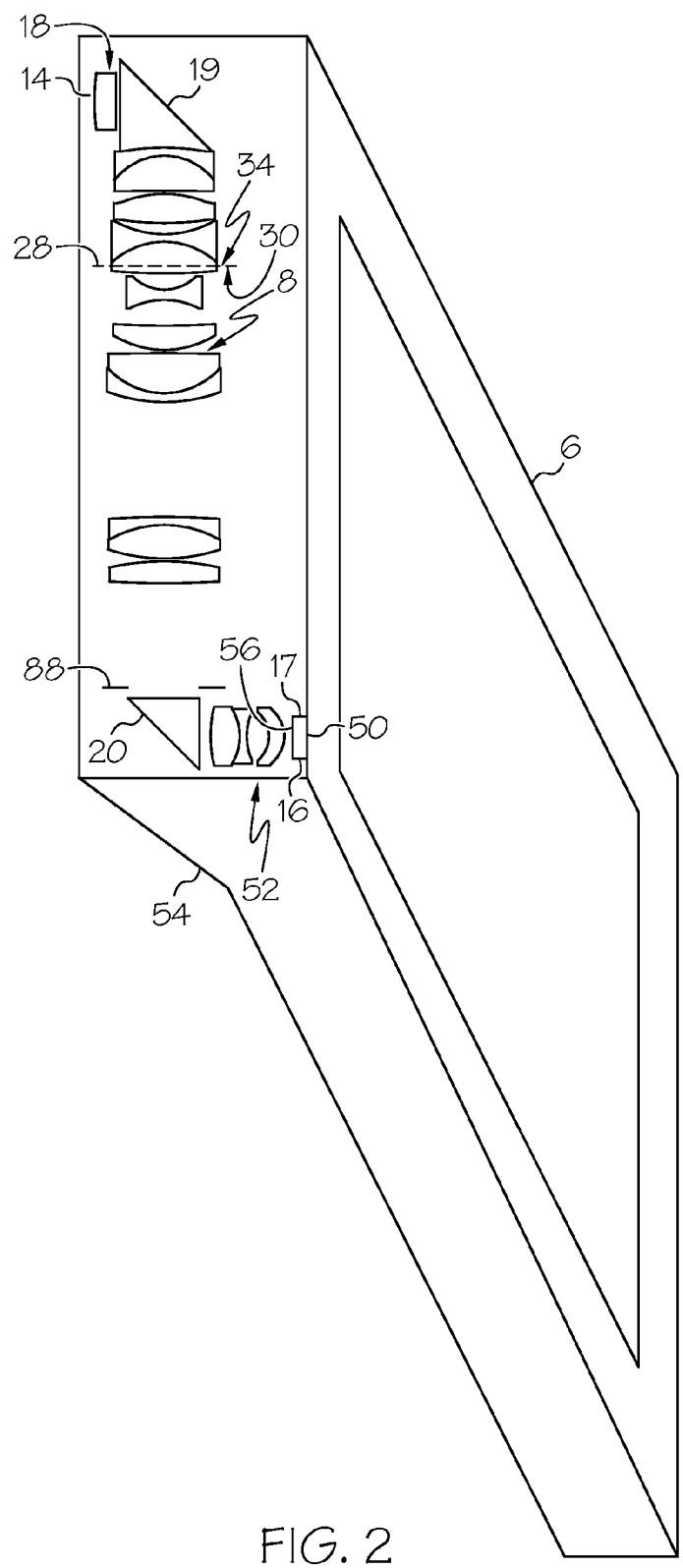
FIG. 2 is a diagrammatical illustration of the cellphone in FIG. 1 with a second exemplary embodiment of the zoom lens.

Illustrated in FIG. 1 is a first embodiment of a zoom lens optical system 10 including a zoom lens 8 for a digital camera 52 and an image pickup device 56 located within a housing 54. The housing 54 may be of a digital camera alone such as a point and shoot digital camera or, as illustrated herein, of a cellphone 6 containing the digital camera 52 within the housing 54. The digital camera illustrated herein by the image pickup device 56 examples of which include Charge-Coupled Devices CCD or Complementary Metal-Oxide Semiconductors CMOS. A second embodiment of the zoom lens 8 for a digital camera 52 located within a housing 54 of a cellphone 6 is illustrated in FIG. 2.

Figure 3:
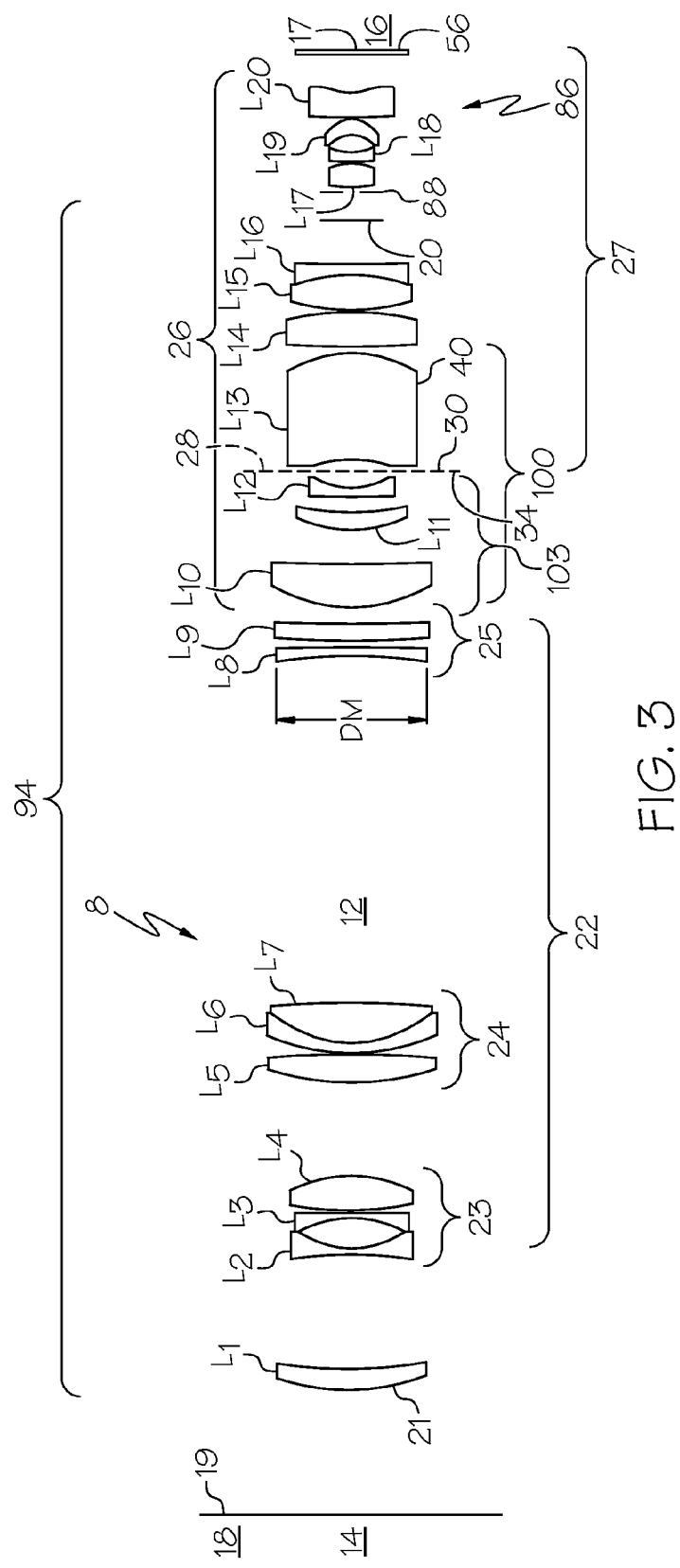
FIG. 3 is an enlarged diagrammatical illustration of the first embodiment of the zoom lens illustrated in FIG. 1 at a wide-angle end of a zoom range for the zoom lens with first, second, and third zoom lens groups on an object side of an intermediate real image plane in an optical path of the zoom lens.
Figure 4:
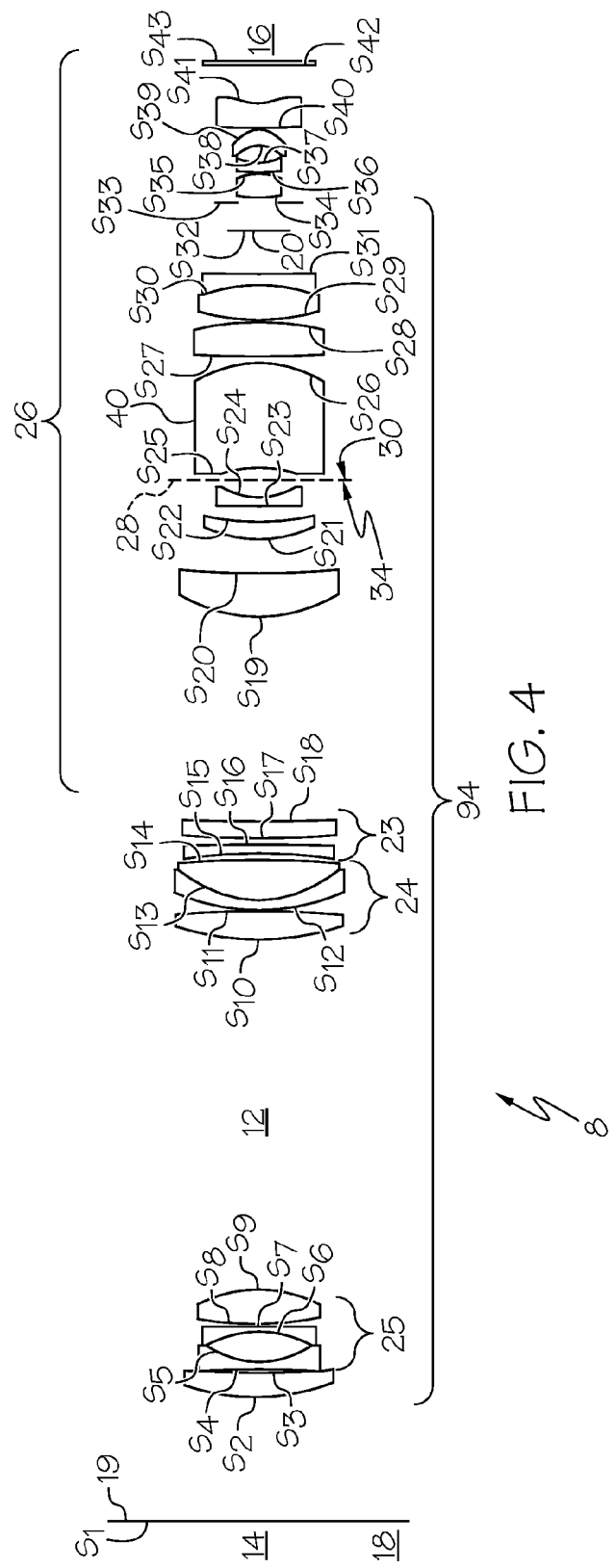
FIG. 4 is a diagrammatical illustration of the zoom lens illustrated in FIGS. 1 and 3 at a telephoto end of the zoom range for the zoom lens.

Referring to FIGS. 1 and 3-4, the first embodiment of the zoom lens 8 includes an optical path 12 and extends from an object end 14 to an image end 16. The zoom lens 8 is operable to form a final image located at a final real image plane 17 at the image end 16. The zoom lens 8 includes a plurality of optical elements arranged in groups to form the final image at the final real image plane 17 on the image pickup device 56.

The zoom lens 8 includes in serial relationship, in a direction from the object end 14 to the image end 16 a first fixed group 21 of optical elements, a zoom module 22, and a second fixed group 26 of optical elements. The first fixed group 21 includes element L1, illustrated herein as a single optical element. The zoom module 22 includes three zoom groups denoted herein by first, second, and third zoom lens groups 23, 24, 25, respectively. The first zoom lens group 23 includes optical elements L2-L4, the second zoom lens group 24 includes optical elements L5-L7, and the third zoom lens group 25 includes optical elements L8-L9. The third zoom group 25 is followed by a second fixed group 26 (also referred to as rear fixed optics) including optical elements L10-L20.

The first fixed group 21 together with the zoom module 22 and a front portion 103 of the second fixed group 26 form an intermediate real image at an intermediate real image plane 28 in the optical path 12 in the zoom lens 8. The front portion 103 is illustrated herein as including optical elements L10-L12 in the second fixed group 26. The intermediate real image at the intermediate real image plane 28 is re-imaged into the final image by a fixed focal length relay 27 which is illustrated herein as including optical elements L13-L20. An aperture stop 88 is located in the fixed focal length relay 27 and, thus, its position remains fixed during zooming. Maintaining a constant diameter of the aperture stop allows for the F/No of the lens to be constant with zooming. The zoom lens 8 has a substantially fixed F/No at all focal lengths. A fixed F/No of about F/3 or faster is particularly useful in applications where pixel sizes (of pixel elements in the image pickup device 56) are extremely small as typically found in cellphone cameras.

The zoom module 22 and all of its zoom groups (the first, second, and third zoom lens groups 23, 24, 25) are located between the object end 14 and the intermediate real image plane 28 of the zoom lens 8. The intermediate real image and the intermediate real image plane 28 have object sides 34 facing toward the object end 14 and image sides 30 facing towards the image end 16. All of the zoom lens groups in the first embodiment of the zoom lens 8 illustrated in FIGS. 1, 3 and 4 are located on the object side 34 of the intermediate real image plane 28 which means they are between the intermediate real image plane 28 and the object end 14 of the zoom lens 8. The first fixed group 21 may be a frontmost fixed group and the second fixed group 26 may be a rearmost fixed group. The frontmost fixed group is nearest fixed group to the object end 14 in the optical path 12 and the rearmost fixed group is nearest fixed group to the image end 16 in the optical path 12.

The exemplary embodiment of the zoom lens 8 illustrated herein further includes a first optical fold 19 at a front 18 of the lens and a second optical fold 20 in the fixed focal length relay 27 in the second fixed group 26 between the optical elements L16 and L17.

The last four elements L17-L20 and the aperture stop 88 represent a diffraction-limited cellphone lens disposed between the second optical path fold 20 and the final real image plane 17. The front portion of the lens, the optical elements L1-L16, operates as a front near diffraction-limited afocal zoom 94 which can work with a prime cellphone lens, because, in this situation, aberration-balancing and/or pupil matching would not be required. Thus, one embodiment of the zoom lens 8 may be used as a zoom attachment to an existing cell phone lens 86 by further including a front near diffraction-limited afocal zoom 94 including all optical elements L1-L16 between the object end 14 and the aperture stop 88.

Figure 5:
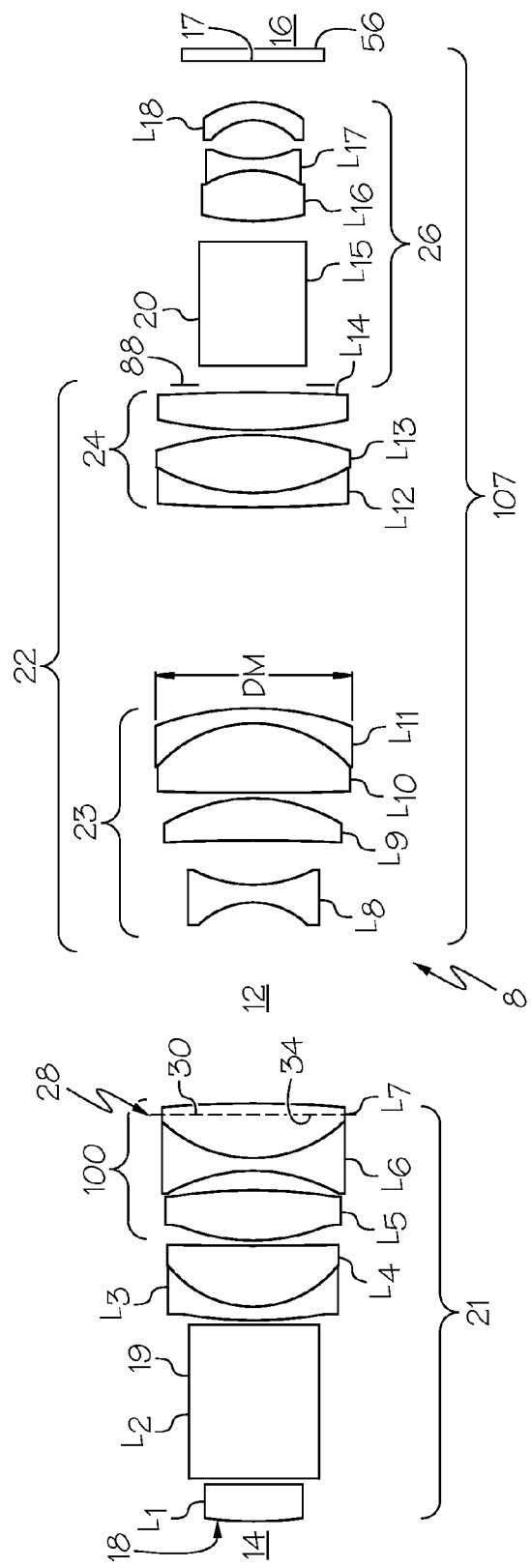
FIG. 5 is an enlarged diagrammatical illustration of the second embodiment of the zoom lens illustrated in FIG. 2 at a wide-angle end of a zoom range for the zoom lens with first and second zoom lens groups on an image side of an intermediate real image plane in an optical path of the zoom lens.
Figure 6:
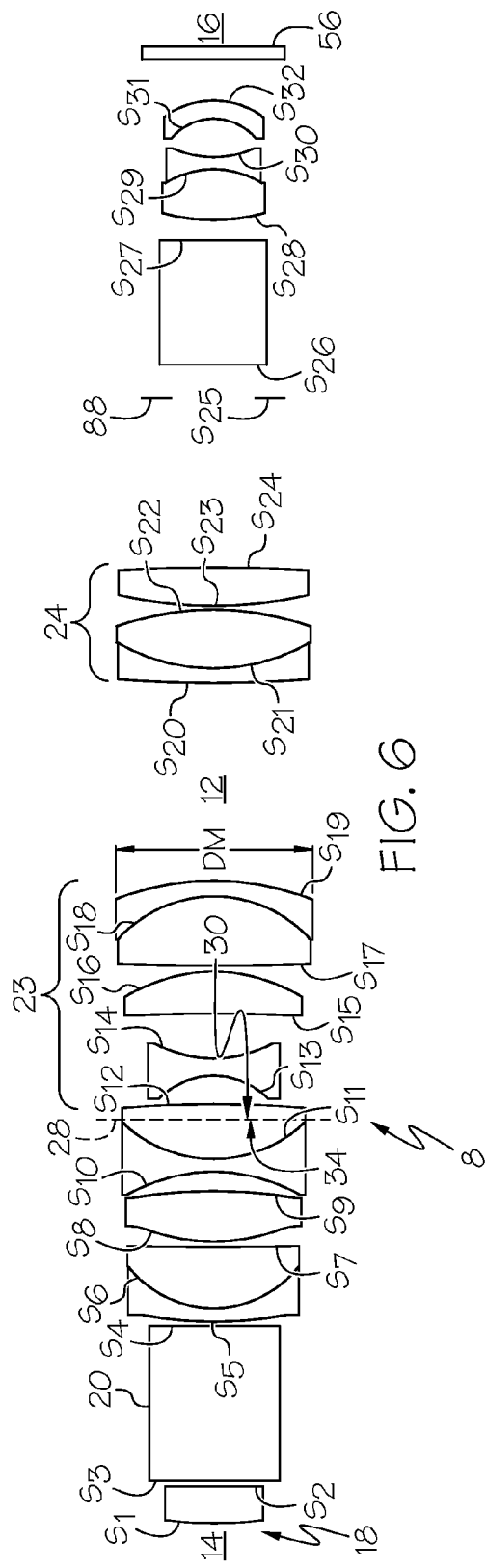
FIG. 6 is a diagrammatical illustration of the zoom lens illustrated in FIGS. 2 and 5 at a telephoto end of the zoom range for the zoom lens.

A second embodiment of the zoom lens 8, illustrated in FIGS. 2 and 5-6, includes an optical path 12 and extends from an object end 14 to an image end 16. The zoom lens 8 includes in serial relationship from the object end 14 to the image end 16 a first fixed group 21 of optical elements, a zoom module 22, and a second fixed group 26 of optical elements. The first fixed group 21 includes optical elements L1-L7. The optical elements L2 and L15 are first and second optical folds 19, 20 respectively and are illustrated herein as a folding right angle prisms or mirrors. The zoom module 22 includes two zoom groups denoted herein by first and second zoom lens groups 23, 24. The first zoom lens group 23 includes optical elements L8-L11 and the second zoom lens group 24 includes optical elements L12-L14. The second fixed group 26 includes optical elements L15-L18. The optical element L15 is the second optical fold 20 illustrated herein as a folding right angle prism.

The first fixed group 21 forms an intermediate real image at an intermediate real image plane 28 in the vicinity of the first fixed group 21 in the optical path 12 in the zoom lens 8. A variable focal length relay 107 re-images the intermediate real image into the final image at a final real image plane 17 at the image end 16. The variable focal length relay 107 is illustrated herein as optical elements L8-L18 and includes the zoom module 22 (the first and second zoom groups 23, 24) and the second fixed group 26. An aperture stop 88 is disposed between the zoom module 22 and the second fixed group 26.

The intermediate real image and the intermediate real image plane 28 have object sides 34 facing toward the object end 14 and image sides 30 facing towards the image end 16. The zoom module 22 and all of its zoom lens groups (the first and second zoom lens groups 23, 24) in the second embodiment of the zoom lens 8 are located on the image side 30 of the intermediate real image plane 28 which means they are between the intermediate real image plane 28 and the image end 16 of the zoom lens 8. The aperture stop 88 is fixed and, thus, remains fixed during zooming. The zoom lens 8 has a substantially fixed F/No at all focal lengths. A fixed F/No of about F/3 or faster is particularly useful in applications such as cameras found in cellphones and other thin devices.

Both of the embodiments 1 and 2 have a stationary aperture stop 88 positioned within a second fixed group 26, which means the aperture stop 88 remains stationary during zooming. Some of the lens elements in close proximity of the intermediate real image plane 28 form field optics 100. The field optics 100 is in the vicinity of and associated with the intermediate real image plane 28. In the first embodiment, the field optics 100 includes elements L11-L13, while in the second embodiment, the field optics 100 includes elements L5-L7. The field optics allows controlling the location of the entrance pupil of the lens close to the front 18 of the zoom lens 8, thereby keeping the size of the first fixed group 21 to the minimum even when covering a wide field of view.

The aperture stop 88 by being stationary allows for the zoom lens 8 to maintain a constant f-number with zooming. Therefore, it can be a simple circular opening, just as is the case for fixed focal length cellphone lenses.

The image pickup device 56 has a sensor diagonal typically smaller than 6 mm and which is also a little less than the thickness of a cellphone housing 54, illustrated in FIGS. 1 and 2. The lens diameter(s) of the lenses in the zoom lens 8 are less than twice the sensor diagonal. As an example, the sensor used for both of the embodiments 1 and 2 of the zoom lens 8 as illustrated herein has a diagonal of 5.5 mm and maximum lens apertures are about 8 mm. To achieve a smallest diameter DM of the optical elements in the zoom lens 8 described herein, it is desirable to have a fixed focal length relay 27 or a variable focal length relay 107 operate with an average magnification having an absolute value of greater than 0.4, and preferably and for the smallest diameter of the optical elements, greater than 0.6, when re-imaging the real intermediate image plane 28 into the final real image plane 17. Note that throughout this application an average magnification is defined as the actual magnification for the fixed focal length relay 27 and the arithmetic average between the low and high ends for the variable focal length relay 107.

Tables 1 and 4 below provide prescriptions for the first and second embodiments, embodiments 1 and 2, of zoom lens 8 illustrated in FIGS. 1 and 3-4, and FIGS. 2 and 5-6, respectively. Tables 1 and 4 include radii, thickness, spaces and glass materials for the lens elements. Some of the surfaces of the lens elements designated "a" are aspherical.

TABLE 1

Folded Zoom for Smartphone - Ex. 1

| Surf. No. | Type | Radius | Thickness | Glass Nd | Glass Vd |
|---|---|---|---|---|---|
| 1 | | Folding mirror | 5.64907 | | |
| 2 | | 9.5859 | 1.00000 | 1.729157 | 54.7 |
| 3 | | 19.7210 | Space 1 | | |
| 4 | | -15.9915 | 0.26719 | 1.882997 | 40.8 |
| 5 | ac | 3.8542 | 1.40000 | | |
| 6 | | -5.3757 | 0.24493 | 1.496999 | 81.5 |
| 7 | | -401.9175 | 0.10000 | | |
| 8 | | 14.6769 | 1.60000 | 1.625880 | 35.7 |
| 9 | | -5.8642 | Space 2 | | |
| 10 | | 12.6520 | 1.30000 | 1.496999 | 81.5 |
| 11 | | -42.2900 | 0.04400 | | |
| 12 | | 9.9633 | 0.44000 | 1.846659 | 23.8 |
| 13 | | 5.4941 | 1.84937 | 1.496999 | 81.5 |
| 14 | | -56.5350 | Space 3 | | |
| 15 | | -22.0865 | 0.38500 | 1.772499 | 49.6 |
| 16 | | -138.7882 | 0.30000 | | |
| 17 | | 41.4727 | 0.77000 | 1.846659 | 23.8 |
| 18 | | 94.4639 | Space 4 | | |
| 19 | | 7.2012 | 2.00000 | 1.882997 | 40.8 |
| 20 | | 89.208 | 1.55621 | | |
| 21 | | 5.9277 | 0.80000 | 1.882997 | 40.8 |
| 22 | | 12.0935 | 0.71838 | | |
| 23 | | 77.2569 | 0.40000 | 1.882997 | 40.8 |
| 24 | a | 3.4960 | 1.30000 | | |
| 25 | | -5.3687 | 4.86530 | 1.882997 | 40.8 |
| 26 | | -5.3857 | 0.30000 | | |
| 27 | | 59.9806 | 1.58439 | 1.804200 | 46.5 |
| 28 | | -12.1034 | 0.10000 | | |
| 29 | | 10.6761 | 1.60000 | 1.882997 | 40.8 |
| 30 | | -7.1963 | 0.50000 | 1.846660 | 23.8 |
| 31 | | 69.9158 | 2.00000 | | |
| 32 | | Folding mirror | 1.50000 | | |
| 33 | | Aperture stop | 0.00000 | | |
| 34 | ac | 3.6459 | 1.10020 | 1.622992 | 58.2 |
| 35 | ac | -2.5826 | 0.07095 | | |
| 36 | | 10.2745 | 0.43989 | 1.805181 | 25.4 |
| 37 | | 2.4918 | 0.78802 | | |
| 38 | ac | -1.3272 | 0.70950 | 1.529758 | 56.3 |
| 39 | ac | -1.1920 | 0.07095 | | |
| 40 | ac | 3.5267 | 1.14939 | 1.529758 | 56.3 |
| 41 | ac | 1.7927 | 1.77200 | | |
| 42 | | 8 | 0.19350 | 1.51633 | 64.1 |
| 43 | | 8 | Image distance | | | a—Polynomial asphere
c—Conic section

TABLE 2

Even Polynomial Aspheres and Conic Constants

| Surf. No. | k | D | E | F | G | H | I |
|---|---|---|---|---|---|---|---|
| 5 | −0.9174 | | | | | | |
| 24 | | 2.7914E−02 | −3.2746E−02 | 1.7759E−02 | −4.4261E−03 | 5.0498E−04 | −1.3018E−05 |
| 34 | 1.9253 | −4.2931E−02 | −1.3416E−02 | 5.4525E−03 | −2.8165E−02 | −1.8529E−02 | 2.8660E−02 |
| 35 | −1.9932 | −2.7640E−02 | −1.9330E−02 | −3.9956E−03 | 2.4834E−03 | 9.3066E−04 | −4.4627E−03 |
| 38 | −2.5510 | −1.0276E−01 | −4.1155E−02 | −2.0932E−02 | 1.5532E−03 | 1.4357E−02 | −8.4034E−04 |
| 39 | −1.8568 | −9.7568E−02 | 6.9081E−03 | −1.0485E−02 | 2.5467E−03 | −2.5279E−04 | 1.2553E−03 |
| 40 | −6.1409 | −7.5224E−02 | 1.8320E−02 | −9.8398E−04 | 3.7571E−05 | 4.9232E−06 | −2.5502E−05 |
| 41 | −7.3467 | −2.0598E−02 | −1.2547E−04 | −2.0385E−04 | 1.2423E−04 | −1.6509E−06 | −2.5175E−06 |

TABLE 3

First Order and Zoom Data

| Zoom Pos. | Space 1 T (3) | Space 2 T (9) | Space 3 T (14) | Space 4 T (18) | Image Distance | Semi-Field of View | Focal Length | F/No |
|---|---|---|---|---|---|---|---|---|
| 1 | 0.220 | 16.138 | 0.300 | 9.474 | 0.00 | 32.5 | −4.1 | 2.8 |
| 2 | 2.042 | 12.897 | 1.892 | 9.302 | 0.00 | 23.5 | −5.4 | 2.8 |
| 3 | 4.227 | 8.082 | 6.484 | 7.340 | 0.00 | 16.0 | −8.4 | 2.8 |
| 4 | 5.221 | 4.263 | 15.889 | 0.760 | 0.00 | 11.1 | −12.0 | 2.8 |

TABLE 4

Folded Zoom for Smartphone - Ex. 2

| Surf. No. | Type | Radius | Thickness | Glass Nd | Glass Vd |
|---|---|---|---|---|---|
| 1 | | 13.2718 | 1.50000 | 1.898220 | 40.8 |
| 2 | | 112.9618 | 0.20000 | | |
| 3 | | 8 | 6.20000 | 1.589130 | 61.1 |
| 4 | | 8 | 0.20000 | | |
| 5 | | 17.5254 | 0.50000 | 1.581439 | 40.7 |
| 6 | | 4.2646 | 2.50000 | 1.804000 | 46.6 |
| 7 | | 540.8178 | 0.20000 | | |
| 8 | a | 6.8417 | 2.00000 | 1.834000 | 37.2 |
| 9 | | −22.1271 | 0.79540 | | |
| 10 | | −6.8727 | 0.50000 | 1.487490 | 70.2 |
| 11 | | 5.3285 | 2.20000 | 1.846660 | 23.2 |
| 12 | | −39.8821 | Space 1 | | |
| 13 | | −3.0455 | 0.70000 | 1.487490 | 70.2 |
| 14 | a | 4.5772 | 1.78377 | | |
| 15 | | −72.5489 | 1.70000 | 1.772499 | 49.6 |
| 16 | | −6.4006 | 0.20000 | | |
| 17 | | 99.7634 | 2.80000 | 1.651597 | 58.6 |
| 18 | | −5.1247 | 0.60000 | 1.620041 | 36.3 |
| 19 | | −10.6559 | Space 2 | | |
| 20 | | 45.7619 | 0.60000 | 1.805181 | 25.4 |
| 21 | | 8.0524 | 2.30000 | 1.496999 | 81.5 |
| 22 | | −12.5344 | 0.20000 | | |
| 23 | | 17.2795 | 1.50000 | 1.772499 | 49.6 |
| 24 | | −99.9395 | Space 3 | | |
| 25 | | Aperture stop | 0.90000 | | |
| 26 | | 8 | 5.00000 | 1.589130 | 61.1 |
| 27 | | 8 | 0.82327 | | |
| 28 | | 8.4321 | 2.00000 | 1.804000 | 46.6 |
| 29 | | −3.6102 | 0.50000 | 1.672700 | 32.1 |
| 30 | | 3.9799 | 1.56349 | | |
| 31 | a | −1.8708 | 0.70000 | 1.581439 | 40.7 |
| 32 | | −3.3054 | Image distance | | | a—Polynomial asphere

TABLE 5

Even Polynomial Aspheres

| Surf. No. | D | E | F | G | H | I |
|---|---|---|---|---|---|---|
| 8 | −1.9851E−03 | 3.6214E−05 | −7.0939E−06 | 2.9401E−07 | 2.0860E−08 | −2.1365E−09 |
| 14 | −4.2289E−03 | 7.8985E−05 | −2.0670E−05 | −8.6835E−07 | 6.1336E−07 | −4.3798E−08 |
| 31 | 2.1812E−02 | −4.5614E−03 | 2.7341E−03 | 4.5942E−04 | −5.3493E−04 | 1.2469E−04 |

TABLE 6

First Order and Zoom Data

| Zoom Pos. | Space 1 T (12) | Space 2 T (19) | Space 3 T (24) | Image Distance | Semi-Field of View | Focal Length | F/No |
|---|---|---|---|---|---|---|---|
| 1 | 8.070 | 8.065 | 0.200 | 2.00 | 32.0 | −4.1 | 2.9 |
| 2 | 5.599 | 9.413 | 1.319 | 2.00 | 24.0 | −5.4 | 2.9 |
| 3 | 3.688 | 9.831 | 2.815 | 2.00 | 20.8 | −7.0 | 2.9 |
| 4 | 2.609 | 9.592 | 4.133 | 2.00 | 17.0 | −8.4 | 2.9 |
| 5 | 1.147 | 7.942 | 7.246 | 2.00 | 11.7 | −12.1 | 2.9 |

Sag z of such surfaces is described by the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system; c is the curvature, a reciprocal of the radius of the surface, at the optical axis; k is a conic constant, which is zero except where indicated in prescription table; and D, E, F, G, H and I are aspheric coefficients set forth in Tables 2 and 5, respectively.

The variable spaces indicating the motion of the zooming groups as well as the corresponding image distance, the semi-field of view, the focal length and the F/No of the lens are provided in the Tables 3 and 6 for the first and second embodiments of the zoom lens 8, respectively. Note that the focal length is a negative number, indicating the final image orientation being the same as that of the object.

The exemplary zoom lens 8 illustrated in FIGS. 3 and 4 may be defined by TABLES 1-3 above. The exemplary zoom lens 8 illustrated in FIGS. 5 and 6 may be defined by TABLES 4-6 above. Tables 1 and 4 show specific numerical values applied to the zoom lens 8 according to the first and second exemplary embodiments of the zoom lenses 8 illustrated in FIGS. 3 and 5 respectively. Optical element defining parameters include, "si" representing the ith surface from the object side, "ri" the ith radius of curvature from the object side, "di" the axial distance between the ith surface and the (i+1)th surface from the object side, "ni" the refractive index at the d-line of a medium having the ith surface from the object side, ".nu.i" the Abbe number of the medium having the ith surface from the object side, "INFINITY" a plane surface, and "ASP" an aspherical surface. Tables 2 and 5 shows axial distances (air gaps) at the wide-angle end state (FIG. 4), an intermediate focal length position between the wide-angle end state and the telephoto end state, and the telephoto end state, f-numbers (FNO), and half angles .omega. as applied to the zoom lens 8 according to the first and second exemplary embodiments of the zoom lenses 8 illustrated in FIGS. 3 and 5 respectively. In Table 2, f represents the focal length of the entire lens system.

Tables 2 and 4 show a conic constant and aspherical coefficients D, E, F, G, H, I of 4th, 6th, 8th, 10th, 12th and 14th orders of the surfaces in the first and second exemplary embodiments of the zoom lenses 8 illustrated in FIGS. 3 and 5 respectively.

Tables 3 and 6 show zoom spaces at various focal length throughout the zoom range, f-numbers (FNO), a corresponding field of view given by a half angle (omega) as applied to the zoom lens 8 according to the first and second exemplary embodiments of the zoom lenses 8 illustrated in FIGS. 3 and 5 respectively.

The embodiments of the zoom lens optical system 10 and zoom lens 8 may be used with or within a digital electronic device 50 including a digital camera 52 having an image pickup device 56 disposed within a housing 54 of the digital electronic device 50 or camera 52. The zoom lens 8 is operable to form a final image on the image pickup device 56. The zoom lens 8 is operable to zoom through its full range while completely contained or disposed within the housing 54. The embodiments of the zoom lens optical system 10 and zoom lens 8 are particularly useful in applications such as cameras found in cellphones and other thin digital electronic devices. The housing 54 may be part of a digital camera alone such as a point and shoot digital camera or, as illustrated herein, of a cellphone 6 containing the digital camera 52 within the housing 54.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

The invention claimed is:

1. A zoom lens, comprising:
an optical path extending from an object end to an image end of the zoom lens,
two or more zoom lens groups in the optical path,
a final real image plane located at the image end of the optical path,
an intermediate real image plane in the optical path,
all of the zoom lens groups either on an image side or on an object side of the intermediate real image plane,
a fixed rear optical group nearest to the image end in the optical path, and
a constant diameter fixed aperture stop in the fixed rear optical group wherein the fixed aperture stop remains stationary during zooming.

2. The zoom lens as claimed in claim 1, further comprising at least one optical path fold in the optical path.

3. The zoom lens as claimed in claim 1, further comprising field optics in the optical path and in the vicinity of and associated with the intermediate real image plane.

4. The zoom lens as claimed in claim 3, further comprising at least one optical path fold in the optical path.

5. The zoom lens as claimed in claim 4, further comprising two optical path folds in the optical path.

6. The zoom lens as claimed in claim 1 further comprising rear fixed optics disposed along the optical path substantially between the image side of the intermediate real image plane and the image end of the optical path and the rear fixed optics including the constant diameter fixed aperture stop which remains stationary during zooming.

7. The zoom lens as claimed in claim 6, further comprising at least one optical path fold in the optical path.

8. A zoom lens comprising:
an optical path extending from an object end to an image end of the zoom lens,
two or more zoom lens groups in the optical path,
an intermediate real image plane in the optical path, all of the zoom lens groups either on an image side or on an object side of the intermediate real image plane,
a final real image plane located at the image end of the optical path,
a fixed focal length relay or a variable focal length relay having an average magnification with an absolute value of greater than 0.4 when re-imaging the real intermediate image plane into the final real image, and
wherein the average magnification for the fixed focal length relay is an actual magnification of the fixed focal length relay and the average magnification for the variable focal length relay is an arithmetic average between low and high ends of the variable focal length relay.

9. The zoom lens as claimed in claim 8 further comprising field optics in the vicinity of the intermediate real image plane in the optical path.

10. A zoom lens comprising:
an optical path extending from an object end to an image end of the zoom lens,
two or more zoom lens groups in the optical path,
an intermediate real image plane in the optical path,
all of the zoom lens groups either on an image side or on an object side of the intermediate real image plane,
field optics in the vicinity of the intermediate real image plane in the optical path,
a final real image plane located at the image end of the optical path,
a fixed focal length relay or a variable focal length relay having an average magnification with an absolute value of greater than 0.4 when re-imaging the real intermediate image plane into the final real image, and
wherein the average magnification for the fixed focal length relay is an actual magnification of the fixed focal length relay and the average magnification for the variable focal length relay is an arithmetic average between low and high ends of the variable focal length relay.

11. A zoom lens, comprising:
an optical path extending from an object end to an image end of the zoom lens,
an intermediate real image plane in the optical path,
field optics in the vicinity of and associated with the intermediate real image plane,
rear fixed optics near a final real image plane at the image end,
a constant diameter fixed aperture stop in the rear fixed optics wherein the aperture stop remains stationary during zooming, and
only a single zooming module including at least two zoom lens groups located on either an image side or on an object side of the intermediate real image plane.

12. The zoom lens as claimed in claim 11, further comprising at least one optical path fold in the optical path.

13. A zoom lens comprising:
an optical path extending from an object end to an image end of the zoom lens,
an intermediate real image plane in the optical path,
field optics in the vicinity of and associated with the intermediate real image plane,
rear fixed optics near a final real image plane at the image end,
a stationary aperture stop in the rear fixed optics wherein the aperture stop remains stationary during zooming,
only a single zooming module including at least two zoom lens groups located on either an image side or on an object side of the intermediate real image plane,
a final real image plane located at the image end of the optical path,
a fixed focal length relay or a variable focal length relay having an average magnification with an absolute value of greater than 0.4 when re-imaging the real intermediate image plane into the final real image, and
wherein the average magnification for the fixed focal length relay is an actual magnification of the fixed focal length relay and the average magnification for the variable focal length relay is an arithmetic average between low and high ends of the variable focal length relay.

14. A zoom lens, comprising:
an optical path extending from an object end to an image end of the zoom lens,
a zooming module including at least two zoom lens groups disposed between a front fixed group of optical elements near the object end and a fixed positive power rear group of optical elements,
a fixed aperture stop in the fixed positive power rear group wherein the fixed aperture stop remains stationary during zooming,
an intermediate real image plane in the optical path and in the vicinity of the positive power rear group, and
a final real image plane located at the image end of the optical path.

15. A zoom lens, comprising:
an optical path extending from an object end to an image end of the zoom lens,
a zooming module including at least two zoom lens groups disposed between a front fixed group of optical elements near the object end and a fixed positive power rear group of optical elements,
an intermediate real image plane in the optical path and in the vicinity of the positive power rear group,
a final real image plane located at the image end of the optical path,
a final real image plane located at the image end of the optical path, and
a fixed focal length relay having a magnification with an absolute value of greater than 0.4 when re-imaging the real intermediate image plane into the final real image.

16. The zoom lens as claimed in claim 15, further comprising a stationary aperture stop in the fixed positive power rear group wherein the aperture stop remains stationary during zooming.

17. The zoom lens as claimed in claim 14, further comprising a front near diffraction-limited afocal zoom 94 including all optical elements between the object end and the aperture stop.

18. The zoom lens as claimed in claim 17, further comprising at least one optical path fold in the optical path.

19. A digital electronic device comprising:
a digital camera including an image pickup device,
the digital camera within a housing,
a zoom lens for the digital camera located within the housing,
the zoom lens including an optical path extending from an object end to an image end the of zoom lens,
the zoom lens operable to form a final image on the image pickup device,
two or more zoom lens groups in the optical path,
a fixed rear optical group nearest to the image end in the optical path,
a constant diameter fixed aperture stop in the fixed rear optical group wherein the fixed aperture stop remains stationary during zooming, an intermediate real image plane in the optical path, and
all of the zoom lens groups either on an image side or on
an object side of the intermediate real image plane.

20. The digital electronic device as claimed in claim 19, further comprising at least one optical path fold in the optical path.

21. The digital electronic device as claimed in claim 19, further comprising field optics in the vicinity of and associated with the intermediate real image plane in the optical path.

22. The digital electronic device as claimed in claim 21, further comprising at least one optical path fold in the optical path.

23. A zoom lens comprising:
a digital camera including an image pickup device,
the digital camera within a housing,
a zoom lens for the digital camera located within the housing,
the zoom lens including an optical path extending from an object end to an image end the of zoom lens,
the zoom lens operable to form a final image on the image pickup device,
two or more zoom lens groups in the optical path,
an intermediate real image plane in the optical path,
all of the zoom lens groups either on an image side or on an object side of the intermediate real image plane,
a final real image plane located at the image end of the optical path,
a fixed focal length relay or a variable focal length relay disposed along the optical path substantially between the image side of the intermediate real image plane and the image end of the optical path,
the fixed focal length relay and the variable focal length relay having an average magnification with an absolute value of greater than 0.4 when re-imaging the real intermediate image plane into the final real image, and
wherein the average magnification for the fixed focal length relay is an actual magnification of the fixed focal length relay and the average magnification for the variable focal length relay is an arithmetic average between low and high ends of the variable focal length relay.

24. The digital electronic device as claimed in claim 23 further comprising at least one optical path fold in the optical path.

25. A digital electronic device comprising:
a digital camera including an image pickup device,
the digital camera within a housing,
a zoom lens for the digital camera located within the housing,
the zoom lens including an optical path extending from an object end to an image end of the zoom lens,
the zoom lens operable to form a final image at a final real image plane located at the image end and on the image pickup device,
an intermediate real image plane in the optical path,
field optics in the vicinity of and associated with the intermediate real image plane,
rear fixed optics near a final real image plane at the image end,
a fixed focal length relay or a variable focal length relay having an average magnification with an absolute value of greater than 0.4 when re-imaging the real intermediate image plane into the final real image wherein the average magnification for the fixed focal length relay is an actual magnification of the fixed focal length relay and the average magnification for the variable focal length relay is an arithmetic average between low and high ends of the variable focal length relay,
an aperture stop in the rear fixed optics wherein the aperture stop remains stationary during zooming, and
only a single zooming module including at least two zoom lens groups located on either an image side or on an object side of the intermediate real image plane.

26. The digital electronic device as claimed in claim 25, further comprising at least one optical path fold in the optical path.

\* \* \* \* \*